Nov. 25, 1969 J. E. BELT ET AL 3,480,916

APPARATUS PROVIDING IDENTIFICATION OF PROGRAMS IN A MULTIPROGRAMMED DATA PROCESSING SYSTEM

Filed Jan. 30, 1967

INVENTORS
JOHN E. BELT
LORENZ A. HITTEL
LASZLO L. RAKOCZI

BY

ATTORNEY

United States Patent Office 3,480,916
Patented Nov. 25, 1969

3,480,916
APPARATUS PROVIDING IDENTIFICATION OF PROGRAMS IN A MULTIPROGRAMMED DATA PROCESSING SYSTEM

John E. Belt, Tucson, and Lorenz A. Hittel, Phoenix, Ariz., and Laszlo L. Rakoczi, Newport Beach, Calif., assignors to General Electric Company, a corporation of New York Filed Jan. 30, 1967, Ser. No. 612,560
Int. Cl. G11c 7/00
U.S. Cl. 340—172.5 11 Claims

ABSTRACT OF THE DISCLOSURE

A data processing system effecting multiprogramming, each program symbolically addressing the memory bank when communication between the executing processor and the memory bank is required, each of the multiprogrammed programs being assigned a unique identifier element, wherein apparatus employing the identifier elements provides a respective topological relationship between the storage cells of the memory bank and the symbolic addresses provided by the corresponding program to enable the cells utilized by each program to be located in noncontiguous regions of the memory bank and to enable a plurality of the programs to have common access to other regions of the memory bank.

BACKGROUND OF THE INVENTION

Figure 1:
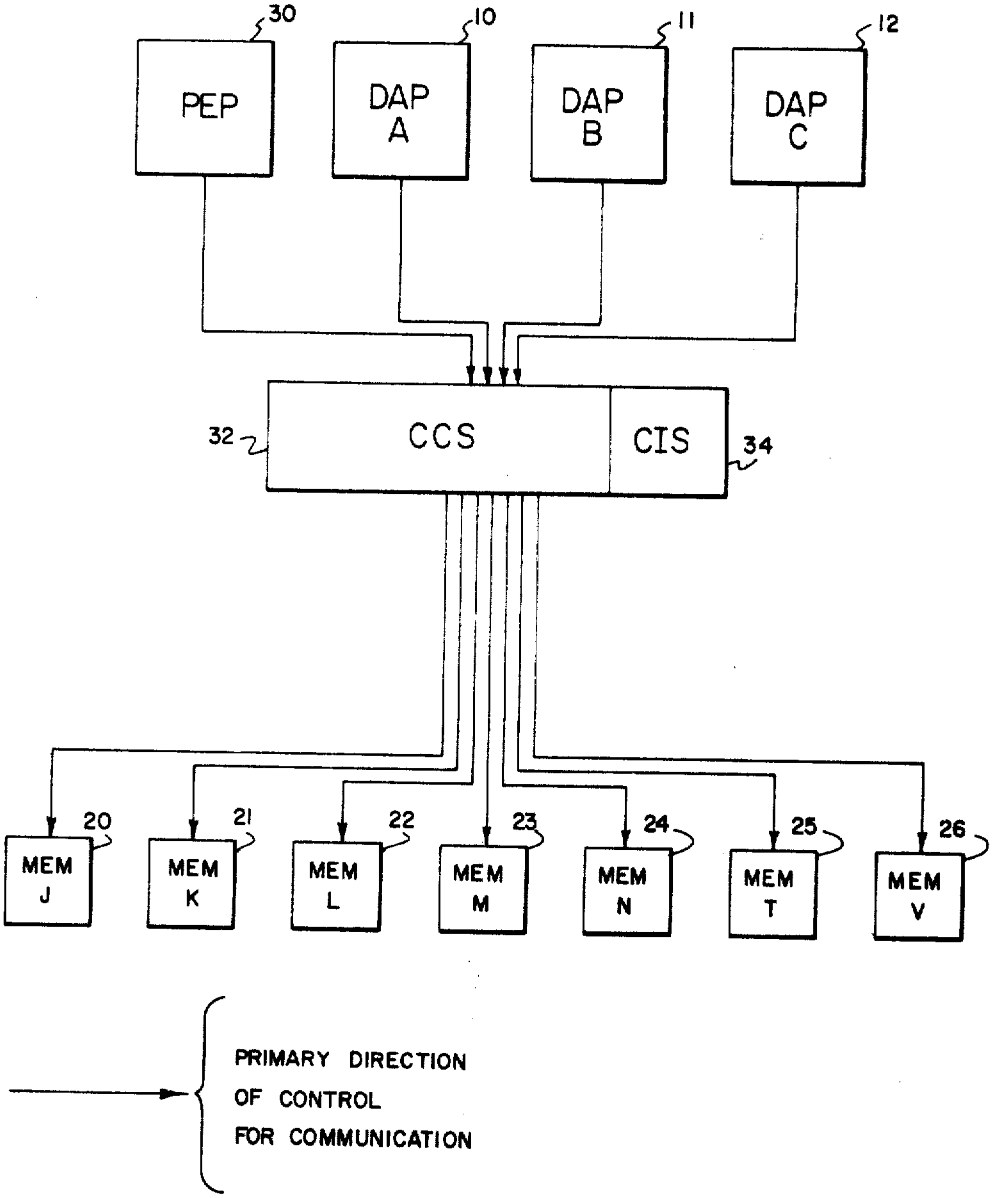

This invention relates to multicomputer and multiprogrammed systems and more particularly to apparatus for exercising management control of a multicomputer or multiprogrammed data processing system.

The multicomputer system is a data processing system comprising a plurality of data processing units, one or more data storage units, and a plurality of input devices and output devices. The data processing units process data by executing separate programs simultaneously and independently of each other. The data storage units store data to be processed, data which is the result of processing, and programs for controlling the processing operations of the data processing units. The input devices supply programs and data to be processed and the output devices receive and utilize processed data.

The multiprogrammed system is a data processing system wherein one or more data storage units store concurrently a plurality of independent programs or portions of such programs. A multiprogrammed system having but one data processing unit alternately executes the stored programs. The multicomputer system functions as a multiprogrammed system, wherein the plural data processing units simultaneously execute respective ones of the plural stored programs.

Communication must be provided within the data processing systems described to transfer programs and data to be processed from the data storage units to the data processing units and to transfer processed data from the data processing units to the data storage units. Communication must also be provided to transfer programs and data to be processed from the input devices to the data storage units and to transfer processed data from the data storage units to the output devices.

The apparatus of the instant invention provides management control for such multicomputer or multiprogrammed systems. Generally, management control of the multicomputer system described comprises expeditiously supplying data to be processed and the programs providing the required data processing functions to the data processing units, and efficiently controlling the output devices to receive and utilize the processed data. This management control is effected by providing and controlling all required communications between data processing units and data storage units and between input and output devices and data storage units; by providing for the assignment of programs to data processing units for execution in accordance with the required urgencies for execution of the different programs, the availability of the required input and output devices, the availability of the required data storage space in the data storage units, and the relative capabilities of the data processing units for executing the different programs; by providing termination of the programs nearing completion and their replacement with other waiting programs; by providing assignment of specific data storage units for programs to be executed; by providing assignment of specific input and output devices for programs to be executed, and initiation and termination of data transfer operations by these devices; by providing the corrective functions required when program or data errors are detected by the data processing units, or when the data processing units become partially or totally inoperative; etc.

Each data processing unit of a multicomputer or multiprogrammed system executes a program independently of the other stored programs. The program comprises a set of instructions, each instruction specifying a discrete type of processing operation. A data processing unit executes a program by sequential responding to each of the instructions of the program to perform the corresponding operations. The data processing unit obtains the instructions of a program in sequence from a set of storage locations, or "cells," in the data storage system, which comprises the plurality of data storage units. Each such cell is identified by a unique identification, termed an "address." Thus, in obtaining the instructions of a program in proper sequence the data processing unit supplies the corresponding addresses in sequence. Additionally, many of the instructions during execution require the data processing unit to further communicate with the data storage system, either to obtain a data item on which the data processing unit is to perform an operation or to store a data item which is the result of an operation. Accordingly, each instruction requiring a transfer of a data item between the data processing unit and the data storage system must also identify the cell which is to supply or receive the data item. Therefore, each program requires a set of cells for storing and supplying data items to be processed by the program, for receiving and storing data items which are the result of processing operations performed by the program, and for storing the instructions of the program, many of the stored instructions comprising an identification of a cell in the set.

A program is only executed by the multicomputer or multiprogrammed system after it has been presented for execution by an input device. An advanced form of management control provides most effective and efficient execution of the waiting programs if, instead of waiting for the availability of specific storage space, each waiting program is accepted from an input device and transferred to the data storage system as soon as the data storage system has free any storage space which is of sufficient capacity and which is provided by the required combination of data storage unit types. After transfer to the data storage system these programs are executed according to their relative urgencies and the availability of the input and output devices required by each program.

However, in utilizing this advanced form of management control the particular portion of the data storage system in which a program is to be stored and executed is not determinable when the program is prepared or when it is being presented by an input device; instead, the storage portion to be employed varies according to the other programs already present when a program is accepted into the data storage system. Accordingly, the instructions in each program which identify data storage system cells can identify neither specific data storage units nor specific cells in a data storage unit; instead, the instructions can identify only symbolically the relative disposition of the cells in which the program is to be executed. In obtaining the instructions of the program in proper sequence, the data processing unit must employ in sequence symbolic identifications, or symbolic addresses, of cells appropriately disposed relative to the cells identified by the symbolic addresses provided by the instructions. Additionally, the symbolic addresses supplied by a data processing unit during execution of a program will identify symbolically a contiguous set of data storage system cells within which the instructions, the data items to be processed, and the processed data items are stored or to be stored.

The copending U.S. patent application Ser. No. 508,168 of J. P. Barlow, R. Barton, J. E. Belt, C. R. Frasier, L. A. Hittel, L. L. Rakoczi, M. A. Torfeh, and J. B. Wiener for Apparatus Providing Symbolic Memory Addressing in a Multicomputer System, filed Nov. 16, 1965, and assigned to the assignee of the instant invention, describes and claims an invention providing an advanced form of management control apparatus for a multicomputer for multiprogrammed system. The management control apparatus of the aforementioned patent application provides for simply, reliably and rapidly converting the symbolic identifications of the storage cells supplied by the programs and the data processing units into corresponding actual addresses of the storage cells in which the instructions of the program, the data items to be processed, and the processed data items are stored or to be stored. The management control apparatus comprises an address translator coupled to the data processing units for receiving each symbolic address as it is presented when a data processing unit is to communicate with the system of data storage units. Upon receiving each symbolic address the translator responds to generate a unique actual address which represents a specific cell in a specific data storage unit. Thus, the address translator employed in the aforementioned invention enables a plurality of programs employing similar series of symbolic addresses to communicate with unique portions of the data storage system for execution.

In a multiprogrammed system the amount of storage space in the data storage system required for storage and execution of each of the plural programs is usually different for each such program. Thus, one program may require a storage space many times greater than the storage space required by another program. The management control apparatus described heretofore provides for insertion of waiting programs into the storage space provided by terminating programs, in preparing for the execution of the waiting program. A waiting program cannot be inserted into the storage system until sufficient storage space has been freed by terminating programs to provide the total storage requirements of the waiting program.

If the waiting program is relatively large compared to the terminating programs, several programs may have to terminate before the amount of storage space which is thereby freed is equal to or greater than the requirements of the waiting program. Since freedom is provided in independently supplying the various programs to be executed, successively terminating programs will not ordinarily occupy contiguously addressable portions of the storage system. The copending U.S. patent application Ser. No. 546,716 of R. Barton, L. Hittel, L. Rakoczi, and J. Wiener for Apparatus Providing Contiguous Addressing for a Non-Contiguous Storage, filed May 2, 1966, and assigned to the assignee of the instant invention, describes and claims an invention to enable more continuous and efficient use of the storage system and to accommodate a waiting program as expeditiously as possible, by providing apparatus enabling the storage and execution of a program in plural portions of the storage system which are not necessarily contiguous. The apparatus provided enables the storage and execution of each of the programs of a multiprogrammed data processing system in noncontiguous portions of the storage system, even though when each such program is executed by a data processing unit, the symbolic addresses provided comprise a contiguous set.

The operational entirety of each program is not necessarily unique in the multiprogrammed system. Certain sets of data and portions of programs are useful to many programs. For example, many programs have need for trigonometric tables. Additionally, many programs require the execution of routine operations such as sorting and merging of data. The copending U.S. patent application Ser. No. 532,262 of J. Barlow and L. Rakoczi for Apparatus Providing Common Memory Addressing in a Symbolically-Addressed Data Processing System, filed Mar. 7, 1966, and assigned to the assignee of the instant invention, describes and claims an invention providing for each program to have access to these generally useful data sets and routines. The apparatus provided in this last-named application provides means for the separately executed programs to communicate with the common data sets and routines. Therefore, although the programs must continue to employ symbolic addressing, this apparatus enables each program to communicate with the particular cells of the storage system containing the common useful information.

In the prior art devices multiprogramming has been effected by assigning a different "base" address to each program in concurrent execution. The base address is the actual address of a cell in the storage system with respect to which all symbolic addresses of the corresponding program are referenced. This reference cell is the cell of lowest address employed during execution of the corresponding program. An actual address is provided for each symbolic address by adding the base address to the symbolic address.

Several limitations are attendant on the use of the "base" address technique of converting symbolic addresses to actual addresses to effect multiprogramming. Inasmuch as the symbolic addresses provided by a program identify symbolically a contiguous group of cells within which the program is stored and executed, the corresponding set of actual addresses developed utilizing the base address identify a contiguous set of actual cells, the lowest-addressed cell of the set being the base or reference cell. Accordingly, each of a plurality of programs in concurrent execution is executed in a respective unique group of contiguous cells.

Therefore, the use of a base address to distinguish among the programs of a multiprogrammed system does not permit the storage and execution of each of the programs in noncontiguous portions of the storage system. Furthermore, such employment of a base address does not permit plural programs of a multiprogrammed system to communicate with common areas of the storage system in order to make most efficient use of common data sets and routines. It is desirable, therefore, to provide apparatus for distinguishing among the programs of a multiprogrammed system without the attendant limitations of the base address technique.

Therefore, it is an object of this invention to provide improved management control apparatus for implementing the effective and efficient execution of the programs in multicomputer and multiprogrammed systems.

Another object of this invention is to provide apparatus for enabling improved communication between a data storage system and a data processing unit which symbolically identifies locations in the data storage system.

Another object of this invention is to provide improved apparatus for enabling each of the plural programs of a multiprogrammed system to be executed with respect to non-contiguous portions of the data storage system.

Another object of this invention is to provide improved apparatus for enabling the plural programs of a multiprogrammed system to communicate with and employ common data sets and routines stored in the memory system.

Another object of this invention is to provide improved apparatus for distinguishing among the plural programs of a multiprogrammed system.

SUMMARY OF THE INVENTION

The foregoing objects are achieved, according to one embodiment of the instant invention, by providing a data processing system wherein an identifier signal group and symbolic address signal group, which together represent a data storage cell, are supplied by a data processing unit during execution of a program for application to an address signal generating apparatus, and wherein the generating apparatus responds to generate the actual address of a cell in the data storage system. A data transmission member provides selective and controllable communication between the one or more data processing units and the one or more data storage units of the data processing system. When a data processing unit is to communicate with the data storage system to receive an instruction, to receive a data item to be processed or to transmit a processed data item, the data processing unit supplies an identifier signal group and a symbolic address signal group, the symbolic address signal group representing the location of a cell in the data storage system relative to a predetermined reference address, the identifier signal group being common for a plurality of the symbolic address signal groups. An address signal generation device is coupled to the data processing units for receiving the identifier signal group and at least a portion of the symbolic address signal group and responds thereto to generate a corresponding output signal group representative of a specific cell in a specific data storage unit. During execution of a particular program the data processing unit supplies a series of symbolic address signal groups representing the locations of a corresponding series of contiguous cells of the storage system relative to a predetermined reference address and supplies a common identifier signal group. The address signal generation device responds to this series of symbolic address signal groups and the identifier signal group to provide a series of output signal groups representative of a plurality of specific cells, the cells being in either contiguous regions or non-contiguous regions of the storage system, and some of these cells being accessible to other programs executed by the data processing unit.

Following generation of an output signal group by the address signal generation device, additional apparatus provides transfer of the output signal group to the data storage system. Upon receiving the output signal group, a data storage unit initiates an operation to provide the required communication between the specifically addressed cell thereof and the initiating data processing unit through the data transmission member.

Certain portions of the apparatus herein disclosed are not of our invention, but are the inventions of:

J. P. Barlow, R. Barton, L. L. Rakoczi, and M. A. Torfeh, as defined by the claims of their application, Ser. No. 618,076, filed Feb. 23, 1967;

J. P. Barlow, R. Barton, E. J. Porcelli, L. L. Rakoczi, and M. A. Torfeh, as defined by the claims of their application, Ser. No. 619,377, filed Feb. 28, 1966;

S. F. Aranyi, J. P. Barlow, L. L. Rakoczi, L. A. Hittel, and M. A. Torfeh, as defined by the claims of their application, Ser. No. 623,284, filed Mar. 15, 1967; and J. R. Hudson, L. L. Rakoczi, and D. L. Sansbury, as defined by the claims of their application, Ser. No. 646,504, filed on June 16, 1967; all such applications being assigned to the assignee of the present application.

We claim:

1. For employment with a data processing unit and a data storage member, said member storing a data word in each one of a plurality of addressable storage cells, the combination comprising: a data word transmission member; said processing unit being adapted to receive data words from said transmission member, to execute a plurality of different operations on received data words, and to transfer data words representing the results of said operations to said transmission member, said processing unit supplying an identifier signal group and a symbolic address signal group when said processing unit is to communicate with said storage member, said symbolic address signal group representing the location of a cell in said storage member relative to a predetermined reference address, said identifier signal group being common for a plurality of said symbolic address signal groups; said storage member being responsive to an actual address signal group representing the actual location of one of said cells for transferring a data word between said cell and said transmission member; an address signal generation device coupled to said processing unit to receive said identifier signal group and a first portion of said symbolic address signal group and responsive thereto for generating a first portion of said actual address signal group; and means for transferring said actual address signal group first portion and the remaining portion of said symbolic address signal group to said storage member, said actual address signal group first portion and said symbolic address signal group remaining portion comprising said actual address signal group.

2. For employment with a data processing unit and a data storage member, said member storing a data word in each one of a plurality of addressable storage cells, the combination comprising: a data word transmission member; said processing unit being adapted to receive data words from said transmission member, to execute a plurality of different operations on received data words, and to transfer data words representing the results of said operations to said transmission member, said processing unit supplying an identifier signal group and a symbolic address signal group when said processing unit is to communicate with said storage member, said symbolic address signal group comprising a first signal subgroup symbolically identifying a block of contiguously addressable cells of said storage member and a second signal subgroup representing the relative location of a cell in one of said blocks, said identifier signal group being common for a plurality of said symbolic address signal groups; said storage member being responsive to an actual address signal group representing the actual location of one of said cells for transferring a data word between said cell and said transmission member; an address signal generation device coupled to said processing unit to receive said identifier signal group and said first signal subgroup and responsive thereto for generating a first portion of said actual address signal group, said actual address signal group first portion representing the actual location of one of said blocks; and means for transferring said actual address signal group first portion and said second signal subgroup to said storage member, said actual address signal group first portion and said second signal subgroup comprising said actual address signal group.

3. For employment with a system comprising at least one data processing unit and a plurality of data storage members, each of said members storing a data word in each one of a respective plurality of addressable storage cells, the combination comprising: a data word transmission member; said processing unit being adapted to receive data words from said transmission member, to execute a plurality of different operations on received data words, and to transfer data words representing the results of said operations to said transmission member, said processing unit supplying an identifier signal group and a symbolic address signal group when said processing unit is to communicate with said storage members, said symbolic address signal group comprising a first signal subgroup symbolically identifying a block of contiguously addressable cells in said storage members and a second signal subgroup representing the relative location of a cell in one of said blocks, said identifier signal group being common for a plurality of said symbolic address signal groups; each of said storage members being responsive to an actual address signal group representing the actual location of one of the cells in said storage member for transferring a data word between the addressed cell and said transmission member, said actual address signal group comprising said second signal subgroup and a third signal subgroup actually identifying one of said blocks; an address signal generation device coupled to said processing unit to receive said identifier signal group and said first signal subgroup and responsive thereto for generating one of said third signal subgroups and a designation signal representing one of said storage members; and means coupled to receive said designation signal and responsive thereto for transferring the corresponding second and third signal subgroups to the one of said storage members represented by said designation signal.

4. For employment with a system comprising a plurality of data processing units and a plurality of data storage members, each of said members storing a data word in each one of a respective plurality of addressable storage cells, the combination comprising: a data word transmission member; said processing units being adapted to receive data words from said transmission member, to execute a plurality of different operations on received data words, and to transfer data words representing the results of said operations to said transmission member, each of said processing units supplying an identifier signal group and a symbolic address signal group when said processing unit is to communicate with said storage members, said symbolic address signal group comprising a first signal subgroup symbolically identifying a block of contiguously addressable cells in said storage members and a second signal subgroup representing the relative location of a cell in one of said blocks, said identifier signal group being common for a plurality of said symbolic address signal groups; each of said storage members being responsive to an actual address signal group representing the actual location of one of the cells in said storage member for transferring a data word between the addressed cell and said transmission member, said actual address signal group comprising said second signal subgroup and a third signal subgroup actually identifying one of said blocks; an address signal generation device coupled to said processing units to receive said identifier signal groups and said first signal subgroups and responsive thereto for generating a corresponding one of said third signal subgroups and a designation signal representing one of said storage members; and means coupled to receive each one of said designation signals and responsive thereto for transferring the corresponding second and third signal subgroups to the one of said storage members represented by said one designation signal.

5. For employment with a data processing system comprising at least one data processor and a data storage system, said storage system storing the data items of a plurality of programs concurrently in the addressable storage cells thereof, the data items of each of said programs comprising symbolic addresses, each symbolic address representing the location of a cell in said storage system relative to a predetermined reference address common to all of said programs, the combination comprising: a data item transmission member; said processor being adapted to execute said programs and during execution to receive data items from or transmit data items to said transmission member, said processor supplying an identifier signal group and a signal group representing one of said symbolic addresses when said processor is to communicate with said storage system, said identifier signal group being unique for each of said programs; said storage system being responsive to an actual address signal group representing the actual location of one of said cells for transferring a data item between said cell and said transmission member; an address signal generation device coupled to said processor to receive said identifier signal group and a first portion of said symbolic address signal group and responsive thereto for generating a first portion of said actual address signal group, said actual address signal group first portion identifying the region of said storage system storing a portion of the program identified by said identifier signal group, and means for transferring said actual address signal group first portion and the remaining portion of said symbolic address signal group to said storage system, said actual address signal group first portion and said symbolic address signal group remaining portion comprising said actual address signal group.

6. For employment with a data processing system comprising at least one data processor and a data storage system, said storage system storing the data items of a plurality of programs concurrently in the addressable storage cells thereof, the data items of each of said programs comprising symbolic addresses, each symbolic address representing the location of a cell in said storage system relative to a predetermined reference address common to all of said programs, the combination comprising: a data item transmission member; said processor being adapted to execute said programs and during execution to receive data items from or transmit data items to said transmission member, said processor supplying an identifier signal group and a signal group representing one of said symbolic addresses when said processor is to communicate with said storage system, said symbolic address signal group comprising a first signal subgroup symbolically identifying a block of contiguously addressable cells of said storage system and a second signal subgroup representing the relative location of a cell in one of said blocks, said identifier signal group being unique for each of said programs; said storage system being responsive to an actual address signal group representing the actual location of one of said cells for transferring a data item between said cell and said transmission member; an address signal generation device coupled to said processor to receive said identifier signal group and said first signal subgroup and responsive thereto for generating a first portion of said actual address signal group, said actual address signal group first portion representing the actual location in said storage system of a block storing a portion of the program identified by said identifier signal group, and means for transferring said actual address signal group first portion and said second signal subgroup to said storage system, said actual address signal group first portion and said second signal subgroup comprising said actual address signal group.

7. For employment with a system comprising a plurality of data processing units and a storage system comprising a plurality of data storage members, said storage system storing the data words of a plurality of programs concurrently in the addressable storage cells thereof, the data words of each of said programs comprising symbolic addresses, each symbolic address representing the location of a cell in said storage system relative to a predetermined address common to all of said programs, the combination comprising: a data word transmission member; said processing units being adapted to execute said programs to receive data words from said transmission member, to execute a plurality of different operations on received data words, and to transfer data words representing the results of said operations to said transmission member, each of said processing units supplying an identifier signal group and a signal group representing one of said symbolic addresses when said processing unit is to communicate with said storage system, said symbolic address signal group comprising a first signal subgroup symbolically identifying a block of contiguously addressable cells in said storage system and a second signal subgroup representing the relative location of a cell in one of said blocks, said identifier signal group being unique for each of said programs; each of said storage members being responsive to an actual address signal group representing the actual location of one of the cells in said storage member for transferring a data word between the addressed cell and said transmission member, said actual address signal group comprising said second signal subgroup and a third signal subgroup actually identifying one of said blocks; an address signal generation device coupled to said processing units to receive said identifier signal groups and said first signal subgroups and responsive thereto for generating a corresponding one of said third signal subgroups and a designation signal representing one of said storage members, said designation signal representing the one of said storage members storing at least a portion of the program identified by said identifier signal group, said one third signal subgroup representing the actual location in said one storage member of the block storing said program portion; and means coupled to receive each one of said designation signals and responsive thereto for transferring the corresponding second and third signal subgroups to the one of said storage members represented by said one designation signal.

8. A data processing system comprising: a data processor and a data storage member, said member storing a data word in each one of a plurality of addressable storage cells; a data word transmission member, said data processor being adapted to receive data words from said transmission member, to execute a plurality of different operations on received data words, and to transfer data words representing the results of said operations to said transmission member, said data processor supplying an identifier signal group and a symbolic address signal group when said data processing unit is to communicate with the data storage member, said symbolic address signal representing the location of a cell in a storage member relative to a predetermined reference address, the identifier signal group being common for a plurality of symbolic address signal groups; the data storage member being responsive to an actual address signal group representing the location of a cell in said member for transferring data words between said cell and said transmission member; and an address signal generation device coupled to said data processor to receive the identifier signal group and the symbolic group and responsive thereto for generating the actual address signal group, and circuit means for delivering said actual address signal group to said data storage member.

9. The data processing system of claim 8 in which the number of bits comprising the symbolic address signal group and the actual address signal group are the same.

10. A data processing system comprising: a data processing unit; a data storage member, said member storing a data word in each one of a plurality of addressable storage cells; a data word transmission member; said processing unit being adapted to receive data words from said transmission member to execute a plurality of different operations on received data words, and to transfer data words representing the results of said operations to said transmission member, said processing unit supplying a first signal group and a second signal group when said processing unit is to communicate with said storage member; said storage member being responsive to an actual address signal group representing the actual location of one of said cells of said data storage member for transferring a data word between the cell corresponding to the actual address signal group and said transmission member; and an address signal generation device coupled to said processing unit to receive said first signal group and responsive thereto for generating a third signal group, said third signal group and said second signal group constituting an actual address signal; and means for coupling said second and third signal groups to said storage member.

11. A data processing system as defined in claim 10 in which the number of bits in the first signal group is larger than the number of bits in said third signal group.

References Cited

UNITED STATES PATENTS

| | | | |
|---|---|---|---|
| Re. 26,171 | 3/1967 | Falkoff | 340—172.5 |
| 3,323,109 | 5/1967 | Hecht et al. | 340—172.5 |
| 3,317,899 | 5/1967 | Chien et al. | 340—172.5 |
| 3,311,887 | 3/1967 | Muroga | 340—172.5 |
| 3,303,477 | 2/1967 | Voigt | 340—172.5 |
| 3,302,182 | 1/1967 | Lynch et al. | 340—172.5 |
| 3,270,324 | 8/1966 | Meade et al. | 340—172.5 |
| 3,243,786 | 3/1966 | Davies | 340—172.5 |
| 3,196,409 | 7/1965 | Davies | 340—172.5 |
| 3,319,226 | 5/1967 | Mott et al. | 340—172.5 |

GARETH D. SHAW, Primary Examiner